United States Patent
Han et al.

(10) Patent No.: US 8,948,040 B2
(45) Date of Patent: Feb. 3, 2015

(54) METHOD AND DEVICE FOR DECIDING LOCATION OF TERMINAL IN A WIRELESS COMMUNICATION SYSTEM

(75) Inventors: Seunghee Han, Gyeonggi-do (KR); Jaehoon Chung, Gyeonggi-do (KM)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 13/820,550

(22) PCT Filed: Sep. 5, 2011

(86) PCT No.: PCT/KR2011/006555
§ 371 (c)(1),
(2), (4) Date: Mar. 4, 2013

(87) PCT Pub. No.: WO2012/030197
PCT Pub. Date: Mar. 8, 2012

(65) Prior Publication Data
US 2013/0176883 A1    Jul. 11, 2013

Related U.S. Application Data

(60) Provisional application No. 61/380,245, filed on Sep. 5, 2010.

(51) Int. Cl.
*H04W 24/00* (2009.01)
*G01S 5/00* (2006.01)
*H04L 5/00* (2006.01)
(Continued)

(52) U.S. Cl.
CPC ............. *H04W 24/00* (2013.01); *G01S 5/0036* (2013.01); *H04L 5/0023* (2013.01); *H04L 5/005* (2013.01); *H04W 64/00* (2013.01); *H04W 72/0446* (2013.01)

USPC ........... 370/252; 370/336; 370/330; 370/328; 370/329

(58) Field of Classification Search
CPC ..... H04L 5/0053; H04L 5/001; H04L 5/0023; H04L 5/0007; H04L 5/0048; H04L 1/1671; H04L 1/0027; H04L 1/0031; H04L 1/1854
USPC .................. 370/252, 336, 330, 328, 329
See application file for complete search history.

(56) References Cited

U.S. PATENT DOCUMENTS

| 2011/0039577 A1* | 2/2011 | Stern-Berkowitz et al. ............ 455/456.1 |
| 2013/0182648 A1* | 7/2013 | Abe et al. ............ 370/328 |
| 2013/0315168 A1* | 11/2013 | Frank et al. ............ 370/329 |

FOREIGN PATENT DOCUMENTS

KR    10-0625431 B    9/2006

OTHER PUBLICATIONS

Written Opinion and International Search Report issued in corresponding International Patent Application No. PCT/KR2011/006555 dated Apr. 4, 2012.

(Continued)

*Primary Examiner* — Jamal Javaid
*Assistant Examiner* — Will Lin
(74) *Attorney, Agent, or Firm* — Morgan, Lewis & Bockius LLP

(57) ABSTRACT

The present invention relates to a method for deciding a location of a terminal in a wireless communication system, and provides the method for deciding the location comprising the following steps: receiving reference signals from a plurality of base stations; and transmitting reference signal time difference (RSTD) which is received from the plurality of base stations, wherein the reference signal is mapped according to a predetermined pattern inside a subframe.

7 Claims, 16 Drawing Sheets

(51) Int. Cl.
 *H04W 64/00* (2009.01)
 *H04W 72/04* (2009.01)

(56) References Cited

OTHER PUBLICATIONS

R4-101925, 'RSTD Measurement Requirement for OTDOA', 3GPP TSG-RAN WG4 Meeting #55, May 10-14, 2010.

R1-092590, 'PRS design for LTE Rel-9 Positioning', 3GPP TSG-RAN WG1 Meeting #57bis, Jun. 29-Jul. 3, 2009.
R1-092107, 'Investigation Positioning Support', 3GPP TSG-RAN WG1 Meeting #57, May 4-8, 2009.
Search Report issued in corresponding International Patent Application No. PCT/KR2011/006555 dated Apr. 4, 2012.

* cited by examiner

METHOD AND DEVICE FOR DECIDING LOCATION OF TERMINAL IN A WIRELESS COMMUNICATION SYSTEM

TECHNICAL FIELD

The present invention relates to a wireless communication system, and more particularly, to a method and device for deciding a location of a user equipment. The wireless communication system may support multiple antennas.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method for efficiently transmitting a reference signal to determine a location of a user equipment in a wireless communication system, and a device for the same. Another object of the present invention is to provide a structure or pattern of a reference signal for determining a location of a user equipment.

It will be appreciated by persons skilled in the art that that the technical objects that can be achieved through the present invention are not limited to what has been particularly described hereinabove and other technical objects of the present invention will be more clearly understood from the following detailed description.

Technical Solution

To achieve the aforementioned objects, according to one aspect of the present invention, a method for determining a location of a user equipment in a wireless communication system comprises the steps of receiving reference signals from a plurality of base stations; and transmitting reference signal time difference (RSTD) between the received reference signals received from the plurality of base stations, wherein the reference signals are mapped within a subframe along a predetermined pattern.

Also, the subframe includes at least one basic unit of which size corresponds to 12 subcarriers×14 OFDM symbols, and the reference signals are mapped into at least one resource element within the basic unit where the resource element is a time-frequency resource defined by one subcarrier and one OFDM symbol.

Also, the predetermined pattern is configured as illustrated in the following pattern Table 1, "P" represents a resource element into which the reference signals are mapped, "SC" is a subcarrier index, and "S" is an OFDM symbol index:

Pattern Table 1

|  | S=0 | S=1 | S=2 | S=3 | S=4 | S=5 | S=6 | S=7 | S=8 | S=9 | S=10 | S=11 | S=12 | S=13 |
|---|---|---|---|---|---|---|---|---|---|---|---|---|---|---|
| SC = 11 |  |  |  |  |  |  |  | P |  |  |  |  |  |  |
| SC = 10 |  |  |  |  |  |  |  |  | P |  |  |  |  |  |
| SC = 9 |  |  |  | P |  |  |  |  |  | P |  |  |  |  |
| SC = 8 |  |  |  |  |  |  |  |  |  |  |  | P |  |  |
| SC = 7 |  |  |  |  | P |  |  |  |  |  |  |  |  |  |
| SC = 6 |  |  |  |  |  | P |  |  |  |  |  |  |  | P |
| SC = 5 |  |  |  |  |  |  | P |  | P |  |  |  |  |  |
| SC = 4 |  |  |  |  |  |  |  |  |  | P |  |  |  |  |
| SC = 3 |  |  |  | P |  |  |  |  |  |  | P |  |  |  |
| SC = 2 |  |  |  |  |  |  |  |  |  |  |  |  | P |  |
| SC = 1 |  |  |  |  | P |  |  |  |  |  |  |  |  |  |
| SC = 0 |  |  |  |  |  | P |  |  |  |  |  |  |  | P |

Also, the predetermined pattern is configured as illustrated in the following pattern Table 2, "P" represents a resource element into which the reference signals are mapped, "SC" is a subcarrier index, and "S" is an OFDM symbol index:

Pattern Table 2

|  | S=0 | S=1 | S=2 | S=3 | S=4 | S=5 | S=6 | S=7 | S=8 | S=9 | S=10 | S=11 | S=12 | S=13 |
|---|---|---|---|---|---|---|---|---|---|---|---|---|---|---|
| SC = 11 |  |  |  |  |  |  |  |  | P |  |  |  |  | P |
| SC = 10 |  |  |  |  |  |  |  |  |  | P |  |  |  |  |
| SC = 9 |  |  |  | P |  |  |  |  |  |  | P |  |  |  |
| SC = 8 |  |  |  |  |  |  |  |  |  |  |  | P |  |  |
| SC = 7 |  |  |  |  | P |  |  |  |  |  |  |  |  |  |
| SC = 6 |  |  |  |  |  | P |  |  |  |  |  |  |  | P |

| | S=0 | S=1 | S=2 | S=3 | S=4 | S=5 | S=6 | S=7 | S=8 | S=9 | S=10 | S=11 | S=12 | S=13 |
|---|---|---|---|---|---|---|---|---|---|---|---|---|---|---|
| Pattern Table 2 | | | | | | | | | | | | | | |
| SC = 5 | | | | | | | | | P | | | | | |
| SC = 4 | | | | | | | | | | P | | | | |
| SC = 3 | | | P | | | | | | | | P | | | |
| SC = 2 | | | | | | | | | | | | P | | |
| SC = 1 | | | | | P | | | | | | | | | |
| SC = 0 | | | | | | P | | | | | | | | |

Also, the predetermined pattern is defined such that every subcarrier within the basic unit has a reference signal mapped thereto and subcarriers each into which a plurality of reference signals are mapped are arranged on a frequency axis at non-constant intervals.

Also, the reference signal is a positioning reference signal (PRS).

Also, the predetermined pattern is cyclic-shifted per cell.

Also, first N number of OFDM symbols within the subframe are used for a control channel, and OFDM symbols more than N+1 are used to determine a location of the user equipment.

To achieve the aforementioned objects, according to another aspect of the present invention, a user equipment in a wireless communication system comprises a receiver configured to receive reference signals from a plurality of base stations; and a controller calculating reference signal time difference (RSTD) between the received reference signals received from the plurality of base stations, wherein the reference signals are mapped within a subframe according to a predetermined pattern.

Also, the subframe includes at least one basic unit of which size corresponds to 12 subcarriers×14 OFDM symbols, the reference signals are mapped into at least one resource element within the basic unit where a resource element is a time-frequency resource defined by one subcarrier and one OFDM symbol.

Also, the predetermined pattern is configured as illustrated in the following pattern Table 3, "P" represents a resource element into which the reference signals are mapped, "SC" is a subcarrier index, and "S" is an OFDM symbol index:

| | S=0 | S=1 | S=2 | S=3 | S=4 | S=5 | S=6 | S=7 | S=8 | S=9 | S=10 | S=11 | S=12 | S=13 |
|---|---|---|---|---|---|---|---|---|---|---|---|---|---|---|
| Pattern Table 3 | | | | | | | | | | | | | | |
| SC = 11 | | | | | | | | | P | | | | | |
| SC = 10 | | | | | | | | | | P | | | | |
| SC = 9 | | | P | | | | | | | | P | | | |
| SC = 8 | | | | | | | | | | | | P | | |
| SC = 7 | | | | P | | | | | | | | | | |
| SC = 6 | | | | | P | | | | | | | | P | |
| SC = 5 | | | | | | | P | | | | | | | |
| SC = 4 | | | | | | | | | | P | | | | |
| SC = 3 | | | P | | | | | | | | P | | | |
| SC = 2 | | | | | | | | | | | | P | | |
| SC = 1 | | | | | P | | | | | | | | | |
| SC = 0 | | | | | | P | | | | | | | | P |

Also, the predetermined pattern is configured as illustrated in the following pattern Table 4, "P" represents a resource element into which the reference signals are mapped, "SC" is a subcarrier index, and "S" is an OFDM symbol index:

Pattern Table 4

| | S=0 | S=1 | S=2 | S=3 | S=4 | S=5 | S=6 | S=7 | S=8 | S=9 | S=10 | S=11 | S=12 | S=13 |
|---|---|---|---|---|---|---|---|---|---|---|---|---|---|---|
| SC = 11 | | | | | | | | P | | P | | | | p |
| SC = 10 | | | | | | | | P | | | | | | |
| SC = 9 | | | P | | | | | | | P | | | | |
| SC = 8 | | | | | | | | | | | P | | | |
| SC = 7 | | | | P | | | | | | | | | | |
| SC = 6 | | | | | | P | | | | | | P | | |
| SC = 5 | | | | | | | | | P | | | | | |
| SC = 4 | | | | | | | | | | P | | | | |
| SC = 3 | | | P | | | | | | | P | | | | |
| SC = 2 | | | | | | | | | | | | P | | |
| SC = 1 | | | | | P | | | | | | | | | |
| SC = 0 | | | | | | | P | | | | | | | |

The predetermined pattern is defined such that every subcarrier within the basic unit has a reference signal mapped thereto subcarriers each into which the plurality of reference signals are mapped are arranged on a frequency axis at non-constant intervals.

The reference signal is a positioning reference signal (PRS).

The predetermined pattern is cyclic-shifted per cell.

Advantageous Effects

According to the embodiments of the present invention, corresponding information may be shared by minimizing signaling overhead without confusion between STAs if there is no available channel within a white space band.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included as a part of the detailed description to provide a further understanding of the invention, provide embodiments of the invention and together with the description serve to explain the principle of the invention. In the drawings.

BEST MODE FOR CARRYING OUT THE INVENTION

Figure 1:
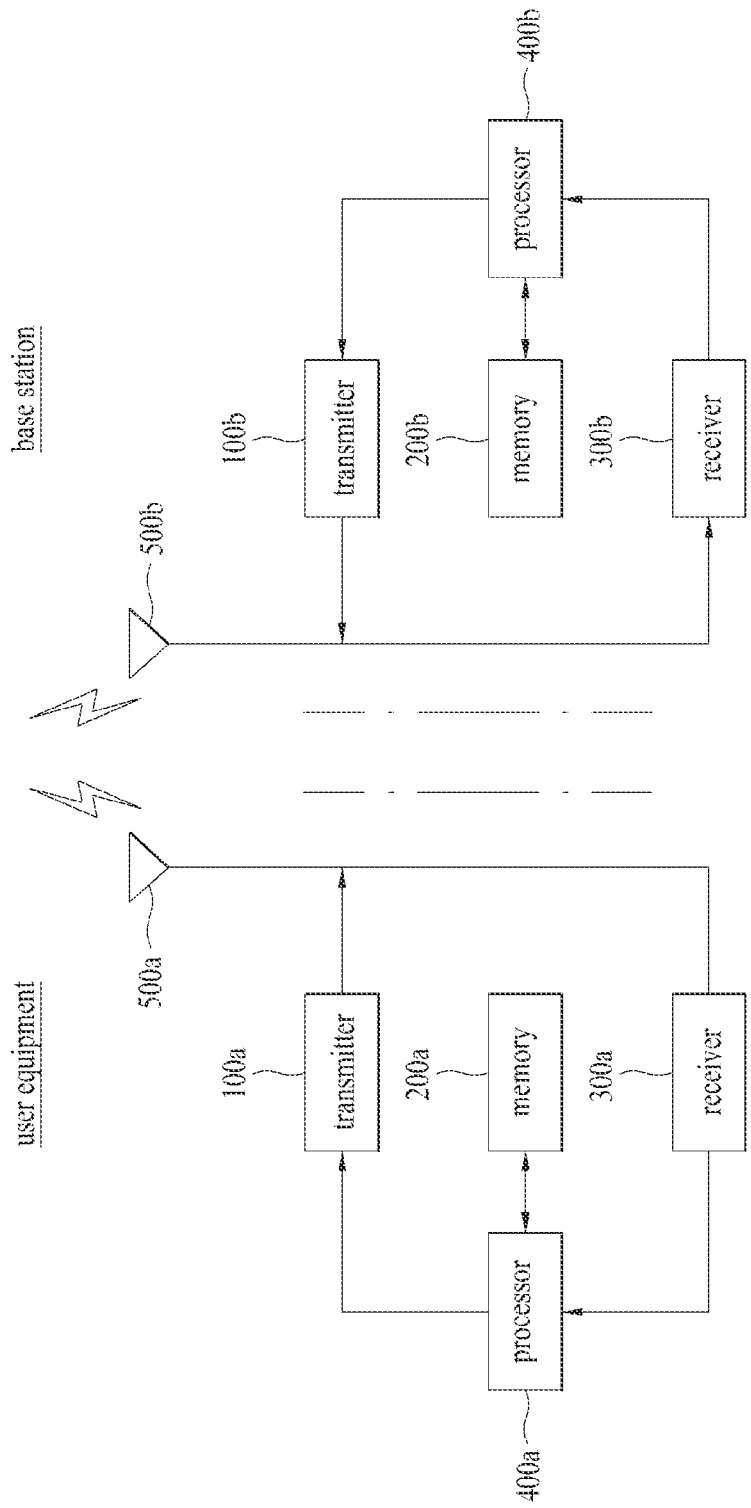
FIG. 1 is a diagram illustrating a configuration of a user equipment and a base station to which the present invention may be applied.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems described herein may be used in various wireless multiple access systems. The wireless access system includes, for example, Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), and Multi-Carrier Frequency Division Multiple Access (MC-FDMA) systems. CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, and Evolved-UTRA (E-UTRA). UTRAN is a part of Universal Mobile Telecommunication System (UMTS) and 3rd Generation Partnership Project (3GPP) Long Term Evolution (LTE) is a part of Evolved UMTS (E-UMTS) using E-UTRAN. 3GPP LTE employs OFDMA on downlink and SC-FDMA on uplink. LTE-A is an evolved version of 3GPP LTE. For convenience of description, it is assumed that the present invention is applied to 3GPP LTE/LTE-A. However, the technical features of the present invention are not limited thereto. For example, while the following detailed description is given focusing upon a 3GPP LTE/LTE-A wireless communication system as a wireless communication system, the description is applicable to any other wireless communication systems except for matters specific to the 3GPP LTE/LTE-A system.

In some instances, known structures and devices may be omitted or may be shown in block diagram form, focusing on important features of the structures and devices, so as not to obscure the concept of the invention. The same reference numbers will be used throughout this specification to refer to the same parts.

In the present invention, a terminal may be fixed or mobile and generically refers to a device for transmitting and receiving data and control information by communicating with a Base Station (BS). The term terminal may be referred to as User Equipment (UE), Mobile Station (MS), Mobile Terminal (MT), User Terminal (UT), Subscriber Station (SS), wireless device, Personal Digital Assistant (PDA), wireless modem, handheld device, etc.

In addition, a BS generically refers to a fixed station which communicates with a terminal or another BS to exchange data and control information with the terminal or another BS. The term BS may be referred to as evolved Node B (eNB), Base Transceiver System (BTS), Access Point (AP), etc.

In the present invention, allocation of a specific signal to a frame/subframe/slot/carrier/subcarrier means transmitting the specific signal on a corresponding carrier/subcarrier during the duration of a corresponding frame/subframe/slot or at the timing of the corresponding frame/subframe/slot.

In the present invention, a rank or a transmission rank refers to the number of layers that are multiplexed or allocated to one Orthogonal Frequency Division Multiplexing (OFDM) symbol or one Resource Element (RE).

In the present invention, a Physical Downlink Control Channel (PDCCH), Physical Control Format Indicator Channel (PCFICH), Physical Hybrid automatic retransmit request Indicator Channel (PHICH), and Physical Downlink Shared Channel (PDSCH) are sets of REs that carry Downlink Control Information (DCI), a Control Format Indicator (CFI), a downlink Acknowledgment/Negative Acknowledgment (ACK/NACK), and downlink data, respectively.

Physical Uplink Control Channel (PUCCH), Physical Uplink Shared Channel (PUSCH), and Physical Random Access Channel (PRACH) are sets of REs that carry Uplink Control Information (UCI), uplink data, and a random access signal, respectively.

Especially, REs allocated to or belonging to the PDCCH, PCFICH, PHICH, PDSCH, PUCCH, PUSCH, and PRACH are referred to as PDCCH, PCFICH, PHICH, PDSCH, PUCCH, PUSCH, and PRACH REs or as PDCCH, PCFICH, PHICH, PDSCH, PUCCH, PUSCH, and PRACH resources.

Accordingly, if it is said that a UE transmits a PUCCH, PUSCH, or PRACH, this may mean that the UE transmits UCI, uplink data, or a random access signal on the PUCCH, PUSCH, or PRACH. In addition, if it is said that a BS transmits a PDCCH, PCFICH, PHICH, or PDSCH, this may mean that the BS transmits DCI or downlink data on the PDCCH, PCFICH, PHICH, or PDSCH.

FIG. 1 illustrates the configuration of a UE and a BS, to which the present invention is applied. The UE operates as a transmitting device on uplink and as a receiving device on downlink. On the contrary, the BS operates as a receiving device on uplink and as a transmitting device on downlink.

Referring to FIG. 1, the UE and the BS include antennas $500a$ and $500b$ for receiving information, data, signals, or messages, transmitters $100a$ and $100b$ for transmitting information, data, signals, or messages by controlling the antennas $500a$ and $500b$, receivers $300a$ and $300b$ for receiving information, data, signals, or messages by controlling the antennas $500a$ and $500b$, and memories $200a$ and $200b$ for temporarily or permanently storing various types of information in a wireless communication system. The UE and the BS further include processors $400a$ and $400b$ connected operationally to the transmitters, the receivers, and the memories, for controlling each component.

The transmitter $100a$, the receiver $300a$, the memory $200a$, and the processor $400a$ of the UE may be configured as independent components by separate chips or two or more thereof may be integrated into one chip. The transmitter $100b$, the receiver $300b$, the memory $200b$, and the processor $400b$ of the BS may be configured as independent components by separate chips or two or more thereof may be integrated into one chip. The transmitter and the receiver may be integrated into a single transceiver in the UE or the BS.

The antennas $500a$ and $500b$ transmit signals generated from the transmitters $100a$ and $100b$ to the outside or receive signals from the outside and provide the received signals to the receivers $300a$ and $300b$. The antennas $500a$ and $500b$ are also referred to as antenna ports. An antenna port may correspond to one physical or logical antenna or a combination of a plurality of physical or logical antennas. If a transmitter and a receiver support Multiple Input Multiple Output (MIMO) in which data is transmitted and received through a plurality of antennas, each of the transmitter and the receiver may be connected to two or more antennas.

The processor $400a$ or $400b$ generally controls overall operation of the components or modules of the UE or the BS. Especially, the processors $400a$ and $400b$ may perform various control functions for implementing the present invention, a Medium Access Control (MAC) frame conversion control function based on service characteristics and a propagation environment, a power saving mode function for controlling an idle-mode operation, a handover function, an authentication and encryption function, etc. The processors $400a$ and $400b$ may be called controllers, microcontrollers, microprocessors, or microcomputers. Meanwhile, the processors $400a$ and $400b$ may be configured in hardware, firmware, software, or a combination of hardware, firmware, and software.

In a hardware configuration, the processors $400a$ and $400b$ may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. which are configured to implement the present invention.

In a firmware or software configuration, firmware or software may be configured so as to include a module, a procedure, a function, etc. that perform the functions or operations of the present invention. The firmware or software configured to implement the present invention may be included in the processors 400a and 400b, or may be stored in the memories 200a and 200b and executed by the processors 400a and 400b.

The transmitters 100a and 100b encode and modulate signals or data which are scheduled by the processors 400a and 400b or schedulers connected to the processors 400a and 400b and to be transmitted to the outside and transmit the modulated signals or data to the antennas 500a and 500b. The transmitters 100a and 100b and the receivers 300a and 300b of the UE and the BS may be configured differently according to operations of processing a transmission signal and a received signal.

The memories 200a and 200b may store programs for processing and controlling in the processors 400a and 400b and may temporarily store input and output information. The memories 200a and 200b may be used as buffers. The memories 200a and 200b may be configured using a flash memory type, a hard disk type, a multimedia card micro type, a card type memory (e.g. a Secure Digital (SD) or extreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disc, etc.

Figure 2:
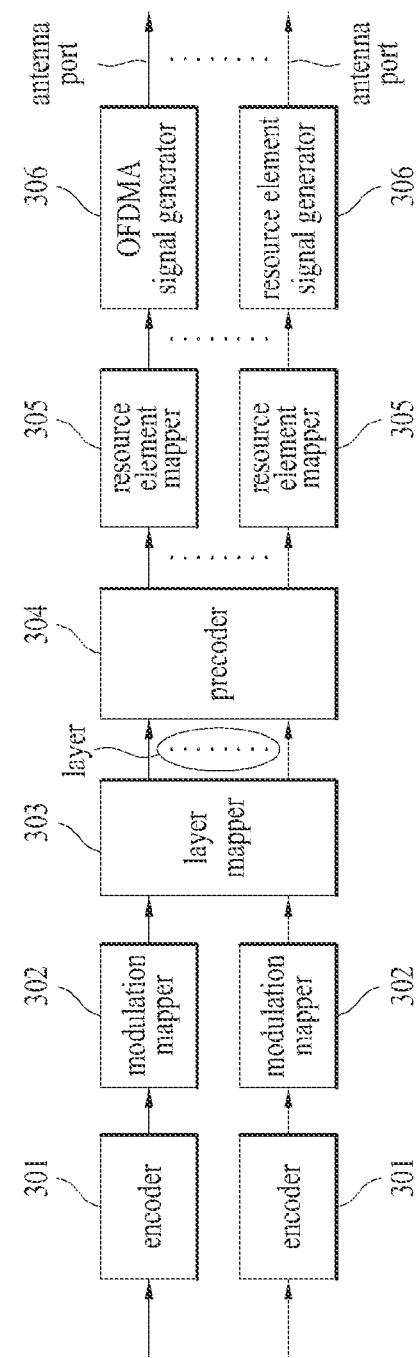
FIG. 2 is a diagram a structure of a transmitter provided with multiple antennas to which the present invention may be applied.

FIG. 2 is a block diagram illustrating a structure of a transmitter provided with multiple antennas to which the present invention may be applied. Referring to FIG. 2, the transmitter may include an encoder 301, a modulation mapper 302, a layer mapper 303, a precoder 304, a resource element mapper 305, and an OFDM signal generator 306.

The encoder 301 generates coded data by encoding input data in accordance with a given coding scheme. The modulation mapper 302 maps the coded data into modulation symbols on signal constellation. There is no limitation in a modulation scheme, and an example of the modulation scheme may include m-phase shift keying (m-PSK) or m-quadrature amplitude modulation (m-QAM). For example, m-PSK may be BPSK, QPSK or 8-PSK, and m-QAM may be 16-QAM, 64-QAM, or 256-QAM.

The layer mapper 303 maps modulation symbols to a plurality of layers. The precoder 304 processes the modulation symbols in accordance with a MIMO scheme based on the multiple transmitting antenna ports and outputs the antenna-specific symbols. Each information path sent to one antenna by the precoder 304 may be referred to as a stream. The resource element mapper 305 allocates the antenna-specific symbols to a proper resource element, and multiplexes them in accordance with users.

The OFDM signal generator 306 modulates the antenna-specific symbols in accordance with the OFDM scheme and output OFDM symbols. The OFDM signal generator 306 may perform inverse fast fourier transform (IFFT) for the antenna-specific symbols, and a cyclic prefix (CP) may be prefixed to a time domain symbol where IFFT has been performed. The generated OFDM symbols are transmitted through each of the transmitting antennas.

Figure 3:
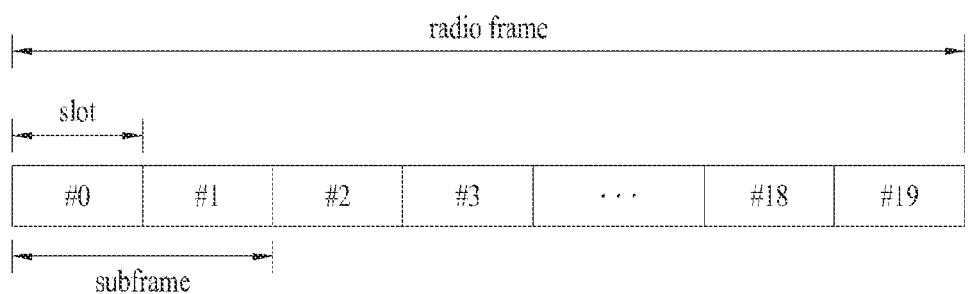
FIG. 3 is a diagram illustrating a structure of a radio frame.

FIG. 3 is a diagram illustrating a structure of a radio frame. Referring to FIG. 3, the radio frame includes 10 subframes, each of which includes two slots. The radio frame may be configured by a frequency division duplex (FDD) or time division duplex (TDD) mode. A time required to transmit one subframe will be referred to as a transmission time interval (TTI). For example, one subframe may have a length of lms, and one slot may have a length of 0.5 ms. One slot includes a plurality of OFDM symbols in a time domain and a plurality of resource blocks (RB) in a frequency domain.

The number of OFDM symbols included in one slot may be varied depending on configuration of CP. Examples of the CP include an extended CP and a normal CP. For example, if the OFDM symbols are configured by the normal CP, the number of OFDM symbols included in one slot may be 7. If the OFDM symbols are configured by the extended CP, since the length of one CP is increased, the number of OFDM symbols included in one slot is smaller than that of OFDM symbols in case of the normal CP. In case of the extended CP, the number of OFDM symbols included in one slot may be 6. If a channel status is unstable like the case where the user equipment moves at high speed, the extended CP may be used.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

The structure of the radio frame is only exemplary, and various modifications may be made in the number of subframes included in the radio frame, the number of slots included in the subframe, or the number of symbols included in the slot.

Figure 4:
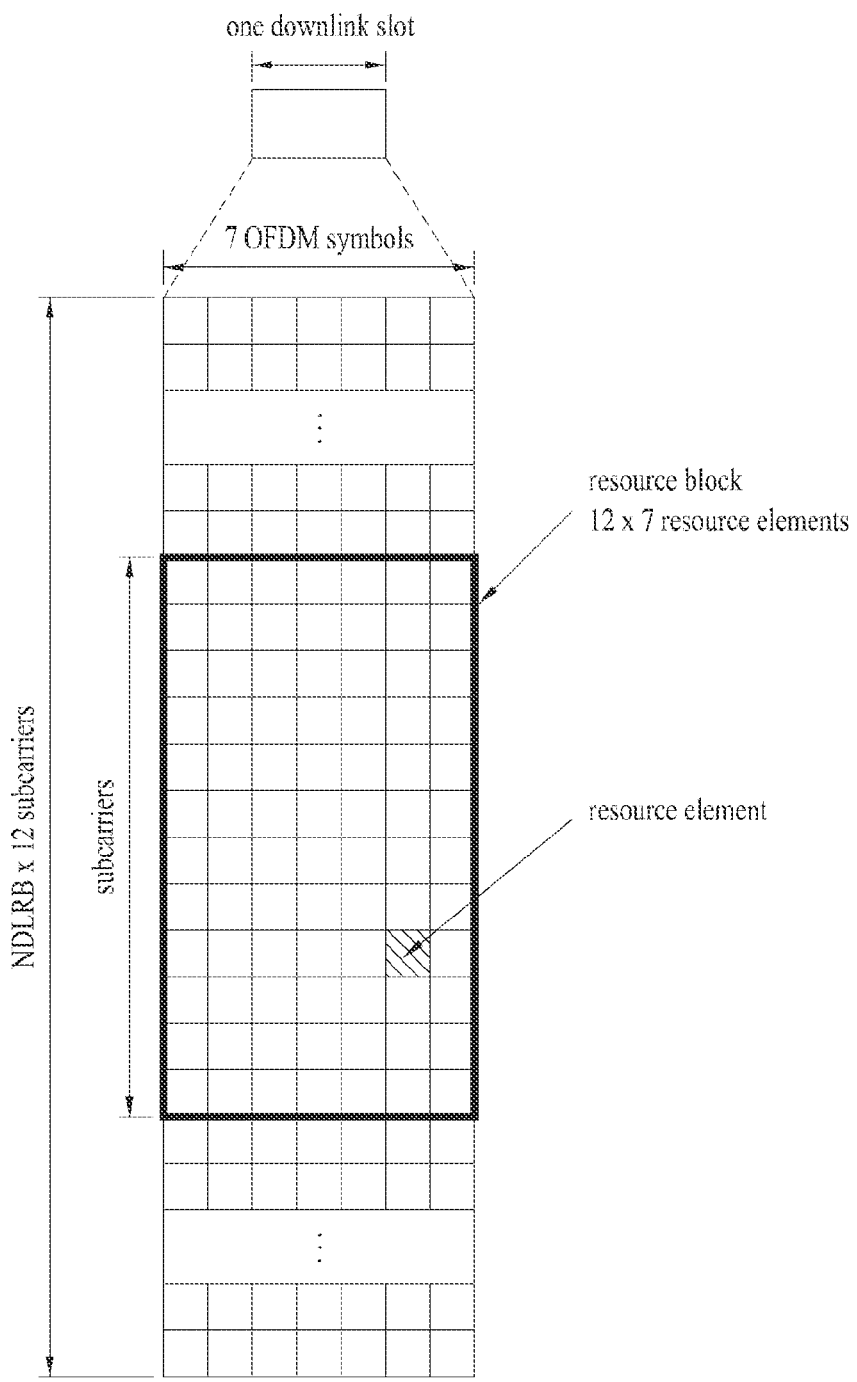
FIG. 4 is a diagram illustrating an example of a resource grid of a downlink slot.

FIG. 4 is a diagram illustrating an example of a resource grid of a downlink slot. In this case, OFDM symbols are configured by the normal CP. Referring to FIG. 4, the downlink slot includes a plurality of OFDM symbols in a time domain and a plurality of resource blocks in a frequency domain. In this case, one downlink slot includes, but not limited to, seven OFDM symbols, and one resource block includes, but not limited to, twelve subcarriers. Each element on the resource grid will be referred to as a resource element (RE). For example, a resource element $a_{k,l}$ corresponds to the resource element located at the kth subcarrier and the first OFDM symbol. In case of the normal CP, one resource block includes 12×7 resource elements (in case of the extended CP, one resource block includes 12×6 resource elements). Since the interval between the respective subcarriers is 15 kHz, one resource block includes about 180 kHz in the frequency domain. $N^{DL}_{RB}$ represents the number of resource blocks included in the downlink slot, and its value may be determined depending on a downlink transmission bandwidth set by scheduling of the base station.

Figure 5:
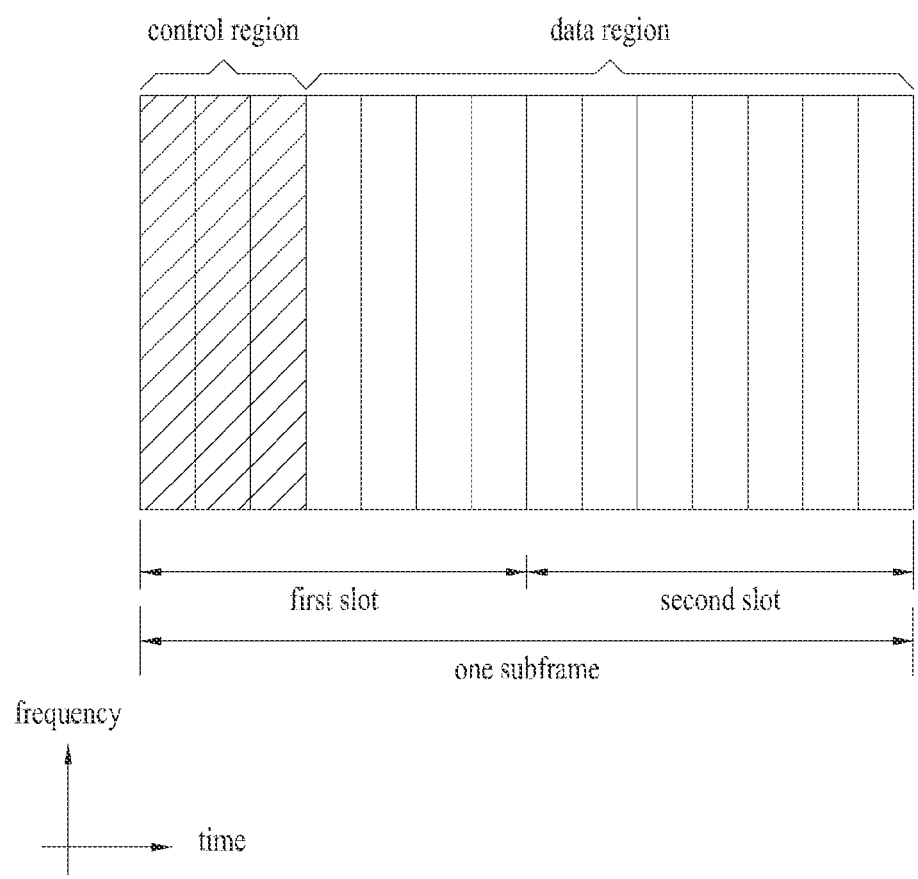
FIG. 5 is a diagram illustrating a structure of a downlink subframe.

FIG. 5 is a diagram illustrating a structure of a downlink subframe. Maximum three OFDM symbols located at the front of the first slot within one subframe correspond to a control region to which a control channel is allocated. The other OFDM symbols correspond to a data region to which a physical downlink shared channel (PDSCH) is allocated. A basic unit of transmission is one subframe. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and includes information on the number of OFDM symbols used for transmission of the control channel within the subframe. The PHICH includes HARQ ACK/NACK (acknowledgement/negative-acknowledgement) signals in response to uplink transmission. The control information transmitted through the PDCCH will be referred to as downlink control information (DCI). The DCI includes uplink or downlink scheduling information, or uplink transmission (Tx) power control command for a random user equipment group. The PDCCH may include transport format and resource allocation information of a downlink shared channel (DL-SCH), resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, transmission power control information, and activity information of voice over Internet protocol (VoIP). A plurality of PDCCHs may be transmitted within the control region, and the user equipment may monitor the plurality of PDCCHs.

The PDCCH is transmitted using one or a plurality of continuous control channel elements (CCEs). The CCE is a logic allocation unit used to provide the PDCCH at a coding rate based on the status of a radio channel. The CCE corresponds to a plurality of resource element groups (REGs).

The format of the PDCCH and the number of available bits of the PDCCH are determined depending on the correlation between the number of CCEs and a coding rate provided by the CCE. The base station determines a PDCCH format and DCI transmitted to the user equipment and attaches cyclic redundancy check (CRC) to the control information. The CRC is masked with an identifier (for example, radio network temporary identifier (RNTI)) depending on usage of the PDCCH or owner of the PDCCH. If the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). In order to represent a random access response which is the response to transmission of random access preamble of the user equipment, the CRC may be masked with a random access RNTI (RA-RNTI).

In the meantime, the needs of positioning of the user equipment have recently been increased due to various applications in real life. The most widely known methods for positioning of a user equipment may include a global positioning system (GPS) based method and a terrestrial positioning method.

The GPS based method is to measure a location of the user equipment by using satellite, and has problems in that it needs receiving signals from at least four satellites and cannot be used indoors.

The terrestrial positioning method is to measure a location of the user equipment by using timing difference of signals from the base stations and needs at least three receiving signals from the base stations. Although the terrestrial positioning method has position estimation performance lower than that of the GPS based method, it can be used under almost all environments. The terrestrial positioning method estimates a location of the user equipment by using a synchronization signal or a reference signal. The terrestrial positioning method is defined in accordance with the standards as follows.

The terrestrial positioning method is defined as observed time difference of arrival (OTDOA) in the UMTS terrestrial radio access network (UTRAN), defined as enhanced observed time difference (E-OTD) in the GSM/EDGE Radio Access Network (GERAN), and defined as advanced forward link Trilateration (AFLT).

Figure 6:
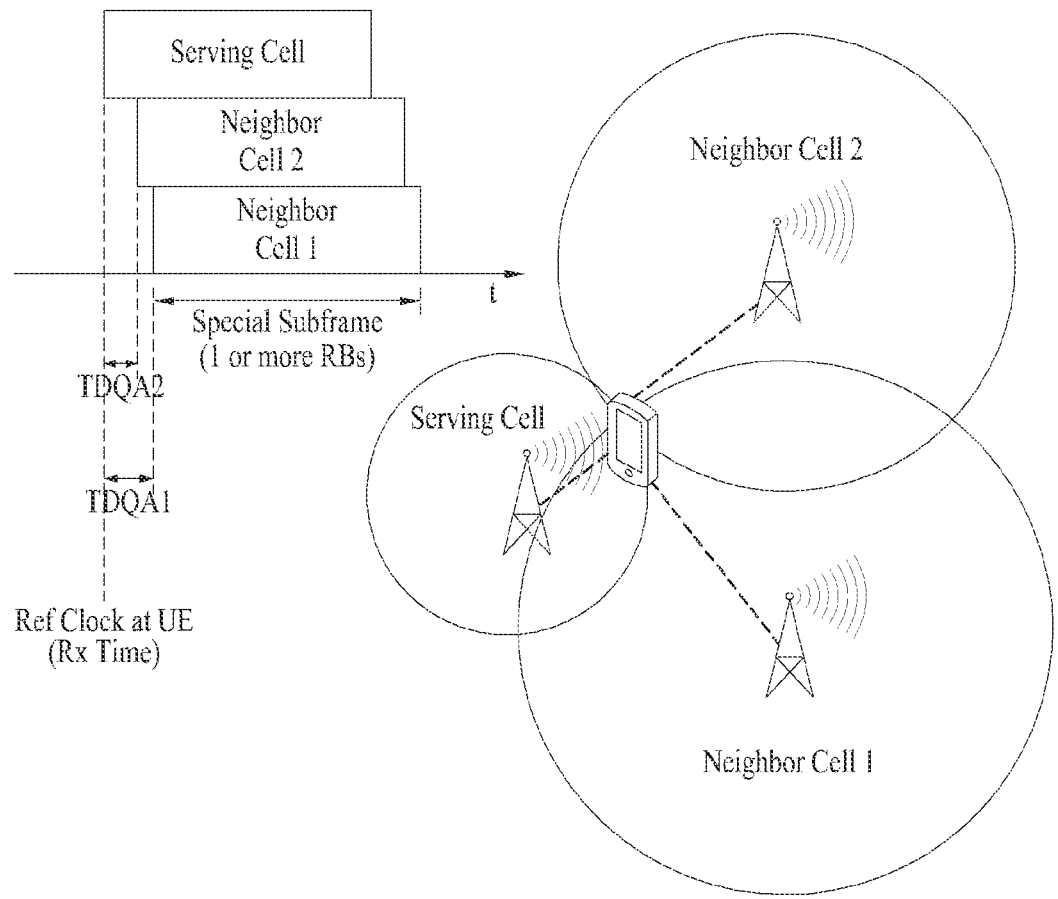
FIG. 6 is a diagram illustrating an example of a downlink OTDOA which is a kind of a terrestrial positioning scheme.

FIG. 6 is a diagram illustrating an example of a downlink OTDOA which is a kind of a terrestrial positioning scheme. As shown in FIG. 6, since the user equipment performs reference clock based on a subframe transmitted from a base station of a serving cell, signals transmitted from base stations of neighbor cells have their respective time difference of arrival (TDOA) different from one another.

Figure 7:
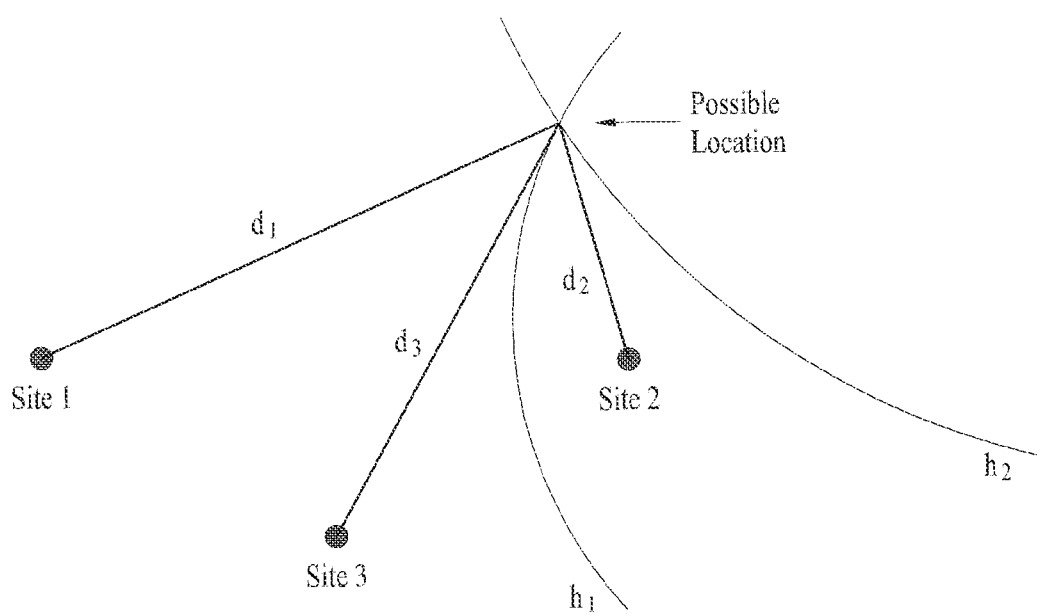
FIG. 7 is a diagram illustrating an example of a method for determining a location of a user equipment based on OTDOA.

FIG. 7 is a diagram illustrating an example of a method for determining a location of a user equipment based on OTDOA. A location of the user equipment may be determined using a linear equation based on Taylor series expansion.

Although the method for determining a location of a user equipment may be performed through a common reference signal (CRS) or a primary synchronization signal/secondary synchronization signal (PSS/SSS), it may be also performed using another measurement reference signal for positioning. The measurement reference signal for positioning may be referred to as a positioning reference signal (PRS). Hereinafter, a pattern of a positioning reference signal for determining a location of the user equipment will be described in more detail.

Figure 8:
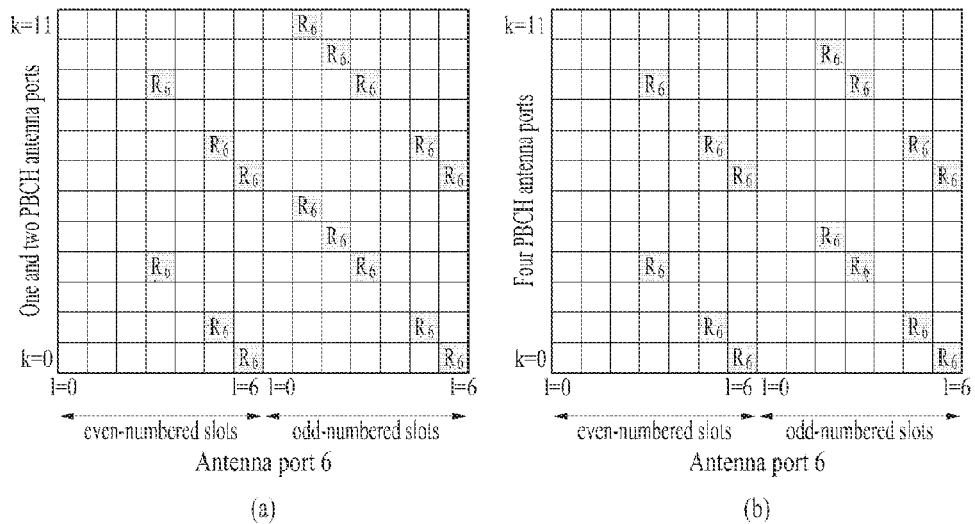
FIG. 8 and FIG. 9 are diagrams illustrating a pattern where a positioning reference signal according to the related art is arranged on a resource block.
Figure 9:
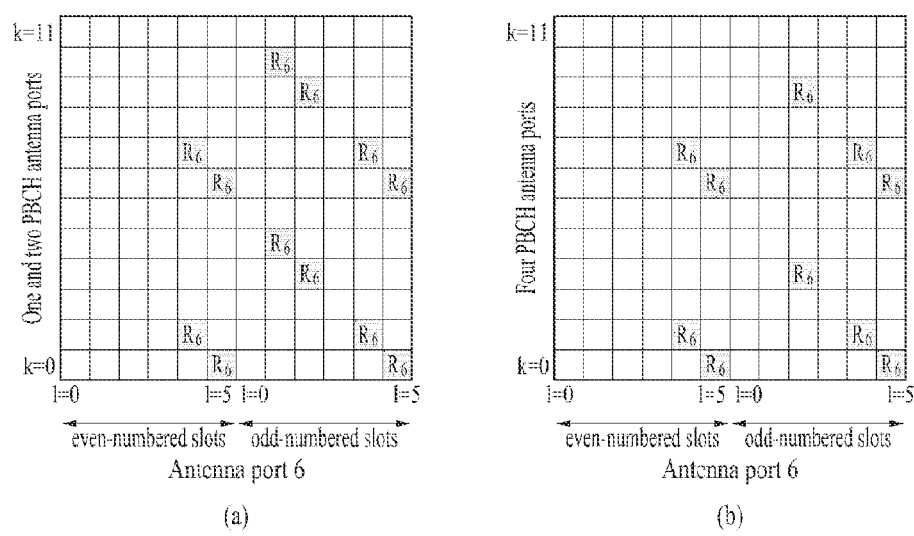

FIG. 8 and FIG. 9 are diagrams illustrating a pattern where a positioning reference signal according to the related art is arranged on a resource block. FIG. 8 illustrates a PRS pattern in a normal CP, and FIG. 9 illustrates a PRS pattern in an extended CP. Referring to FIG. 8 and FIG. 9, a horizontal axis represents index (l) of OFDM symbol based on one slot, and a vertical axis represents frequency index or subcarrier index (k). In a specific cell, the PRS pattern may have a structure that the PRS is uniformly distributed in one resource block (for example, subframe) in the form of a diagonal matrix. In the other cell, the PRS may be transmitted by cyclic shift to the frequency axis (vertical axis)/time axis (horizontal axis).

In this case, even though the PRS transmitted from the two cells are synchronized with each other, the location of the user equipment may be measured without collision between the cells. In other words, different PRS patterns may be configured between the cells, whereby the location of the user equipment may be measured without collision of the PRS between the cells. At this time, collision means that the PRS transmitted from the two cells are located on the same time and frequency resources on the subframe to interfere with each other. In the meantime, the PRS patterns may be defined as expressed by the following Equation 4.

$$a_{k,l}^{(p)} = r_{l,n_s}(m') \quad \text{[Equation 4]}$$

A reference signal sequence $r_{l,n_s}(m)$ may be mapped into complex modulation symbols $a_{k,l}^{(p)}$ used as reference signals for antenna port p at a slot $n_s$. $n_s$ represents a slot number (0~19) within one radio frame, and k and l are indexes of resource elements used for the reference signals and mean the k-th subcarrier and the l-th OFDM symbol, respectively.

In the Equation 4, the normal CP satisfies the following Equation 15, and the extended CP satisfies the following Equation 6.

$$k = 6(m + N_{RB}^{DL} - N_{RB}^{PRS}) + (6 - l + v_{shift}) \bmod 6 \quad \text{[Equation 5]}$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ PBCH antenna ports}) \\ 2, 3, 5, 6 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

$$k = 6(m + N_{RB}^{DL} - N_{RB}^{PRS}) + (5 - l + v_{shift}) \bmod 6 \quad \text{[Equation 6]}$$

-continued $$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ } PBCH \text{ antenna ports}) \\ 2, 4, 5 & \text{if } n_s \bmod 2 = 1 \text{ and} \\ & (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

In the Equations 5 and 6, $N_{RB}^{max,DL}$ represents the number of RBs corresponding to a downlink maximum bandwidth, $N_{RB}^{PRS}$ represents the number of RBs on which the reference signal is transmitted, and $v_{shift}$ is a value of cyclic shift on the frequency axis and may satisfy $v_{shift}=N_{Cell}^{ID} \bmod 6$, for example. $N_{Cell}^{ID}$ represents a physical layer cell identifier.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 7]}$$

$$m = 0, 1, \ldots, 2N_{RB}^{max,DL} - 1$$

The Equation 7 represents a reference signal sequence. In the Equation 7, c is a PN sequence and may be defined as a gold sequence of length-31.

In the meantime, positioning performance depends on exactness of the estimated time. The exactness of the estimated time depends on auto correlation. In other words, if characteristics of auto correlation are improved, positioning performance is also improved. Since positioning should be measured in a very low geometrical structure, it is required that an auto correlation output value of a second peak should be lower than 13 dB in comparison with a maximum peak. If a plurality of side peaks occur and a difference value between a maximum peak and a side peak is small, since the maximum peak timing cannot be calculated exactly, exactness of the estimated time may be reduced.

Figure 10:
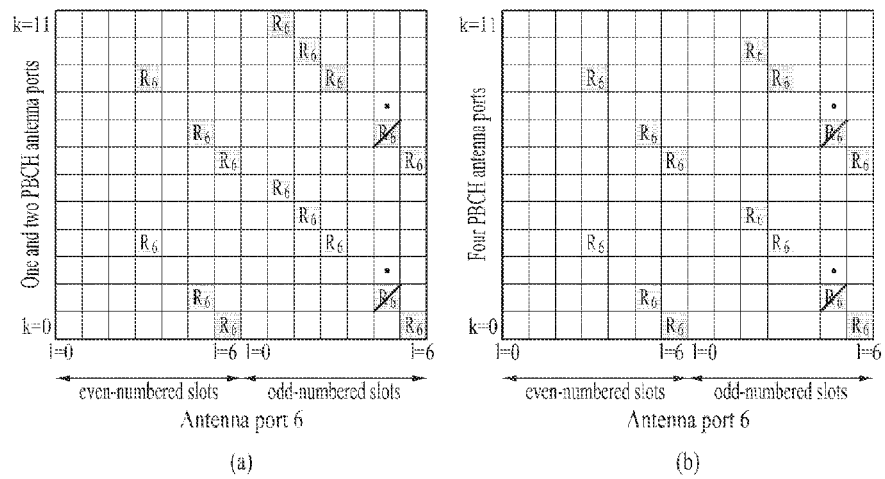
FIG. 10 and FIG. 11 are diagrams illustrating a pattern where a positioning reference signal according to the first embodiment of the present invention is arranged on a resource block.
Figure 11:
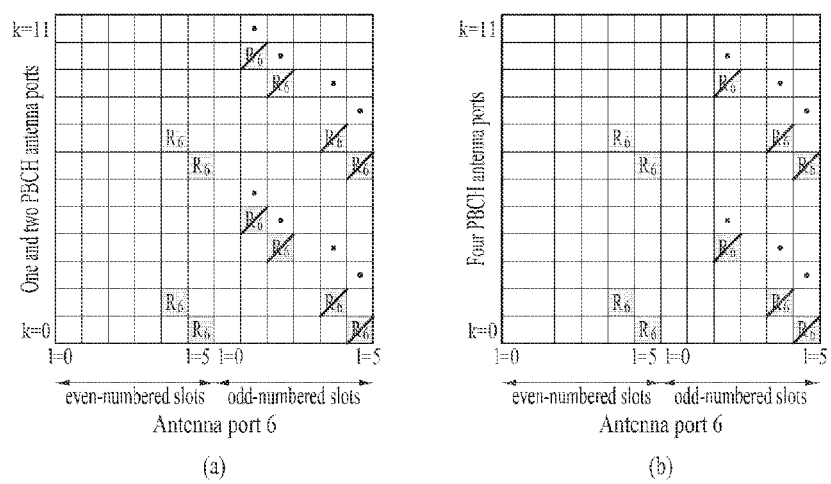

FIG. 10 and FIG. 11 are diagrams illustrating a pattern where a positioning reference signal according to the first embodiment of the present invention is arranged on a resource block. FIG. 10 illustrates a PRS pattern in case of a normal CP, and FIG. 11 illustrates a PRS pattern in case of an extended CP.

Referring to FIG. 10(a), a single antenna port or two antenna ports are used, and it is assumed that the leftmost of the horizontal axis based on one slot is OFDM symbol 0 and the lowest of the vertical axis based on one slot is subcarrier 0. In this case, the PRS may be transmitted through RE of OFDM symbol 3 and subcarrier 3 of the first slot, RE of OFDM symbol 3 and subcarrier 9 of the first slot, RE of OFDM symbol 5 and subcarrier 1 of the first slot, RE of OFDM symbol 5 and subcarrier 7 of the first slot, RE of OFDM symbol 6 and subcarrier 0 of the first slot, RE of OFDM symbol 6 and subcarrier 6 of the first slot, RE of OFDM symbol 1 and subcarrier 5 of the second slot, RE of OFDM symbol 1 and subcarrier 11 of the second slot, RE of OFDM symbol 2 and subcarrier 4 of the second slot, RE of OFDM symbol 2 and subcarrier 10 of the second slot, RE of OFDM symbol 3 and subcarrier 3 of the second slot, RE of OFDM symbol 3 and subcarrier 9 of the second slot, RE of OFDM symbol 5 and subcarrier 2 of the second slot, RE of OFDM symbol 5 and subcarrier 8 of the second slot, RE of OFDM symbol 6 and subcarrier 0 of the second slot, and RE of OFDM symbol 6 and subcarrier 6 of the second slot.

Also, referring to FIG. 10(b), four antenna ports are used, and it is assumed that the leftmost of the horizontal axis based on one slot is OFDM symbol 0 and the lowest of the vertical axis based on one slot is subcarrier 0. In this case, the PRS may be transmitted through RE of OFDM symbol 3 and subcarrier 3 of the first slot, RE of OFDM symbol 3 and subcarrier 9 of the first slot, RE of OFDM symbol 5 and subcarrier 1 of the first slot, RE of OFDM symbol 5 and subcarrier 7 of the first slot, RE of OFDM symbol 6 and subcarrier 0 of the first slot, RE of OFDM symbol 6 and subcarrier 6 of the first slot, RE of OFDM symbol 2 and subcarrier 4 of the second slot, RE of OFDM symbol 2 and subcarrier 10 of the second slot, RE of OFDM symbol 3 and subcarrier 3 of the second slot, RE of OFDM symbol 3 and subcarrier 9 of the second slot, RE of OFDM symbol 5 and subcarrier 2 of the second slot, RE of OFDM symbol 5 and subcarrier 8 of the second slot, RE of OFDM symbol 6 and subcarrier 0 of the second slot, RE of OFDM symbol 6 and subcarrier 6 of the second slot.

Referring to FIG. 11(a), a single antenna port or two antenna ports are used, and it is assumed that the leftmost of the horizontal axis based on one slot is OFDM symbol 0 and the lowest of the vertical axis based on one slot is subcarrier 0. In this case, the PRS may be transmitted through RE of OFDM symbol 4 and subcarrier 1 of the first slot, RE of OFDM symbol 4 and subcarrier 7 of the first slot, RE of OFDM symbol 5 and subcarrier 0 of the first slot, RE of OFDM symbol 5 and subcarrier 6 of the first slot, RE of OFDM symbol 1 and subcarrier 5 of the second slot, RE of OFDM symbol 1 and subcarrier 11 of the second slot, RE of OFDM symbol 2 and subcarrier 4 of the second slot, RE of OFDM symbol 2 and subcarrier 10 of the second slot, RE of OFDM symbol 4 and subcarrier 3 of the second slot, RE of OFDM symbol 4 and subcarrier 9 of the second slot, RE of OFDM symbol 5 and subcarrier 2 of the second slot, and RE of OFDM symbol 5 and subcarrier 8 of the second slot.

Also, referring to FIG. 11(b), four antenna ports are used, and it is assumed that the leftmost of the horizontal axis based on one slot is OFDM symbol 0 and the lowest of the vertical axis based on one slot is subcarrier 0. In this case, the PRS may be transmitted through RE of OFDM symbol 4 and subcarrier 1 of the first slot, RE of OFDM symbol 4 and subcarrier 7 of the first slot, RE of OFDM symbol 5 and subcarrier 0 of the first slot, RE of OFDM symbol 5 and subcarrier 6 of the first slot, RE of OFDM symbol 5 and subcarrier 2 of the second slot, RE of OFDM symbol 2 and subcarrier 4 of the second slot, RE of OFDM symbol 4 and subcarrier 10 of the second slot, RE of OFDM symbol 4 and subcarrier 3 of the second slot, RE of OFDM symbol 5 and subcarrier 9 of the second slot, RE of OFDM symbol 5 and subcarrier 2 of the second slot, and RE of OFDM symbol 5 and subcarrier 8 of the second slot.

As compared with the related art, in view of the frequency domain, the first embodiment maps one PRS per subcarrier as far as possible such that every subcarrier has a PRS allocated thereto. In other words, as compared with the PRS patterns of FIG. 8 and FIG. 9, the PRS on a subcarrier (for example, k=0, 1, 6 and 7), which include a plurality of PRSs, is frequency-shifted onto a subcarrier (for example, k=2, 5, 8 and 11) which had no PRS mapped thereto.

For example, the PRS pattern of FIG. 10(*a*), which uses a single antenna port or two antenna ports, has been shifted from the PRS pattern of FIG. 8(*a*) in such a manner that the PRS of the OFDM symbol 5 and the subcarrier 1 of the second slot and the PRS of the OFDM symbol 5 and the subcarrier 7 of the second slot has been frequency-shifted to RE of the OFDM symbol 5 and the subcarrier 2 and RE of the OFDM symbol 5 and the subcarrier 8, respectively, as much as 1. Also, the PRS pattern of FIG. 10(*b*), which uses four antenna ports, has been shifted from the PRS pattern of FIG. 8(*b*) in such a manner that the PRS of the OFDM symbol 5 and the subcarrier 1 of the second slot and the PRS of the OFDM symbol 5 and the subcarrier 7 of the second slot has been frequency-shifted to RE of the OFDM symbol 5 and the subcarrier 2 and RE of the OFDM symbol 5 and the subcarrier 8, respectively, as much as 1. The PRS pattern of FIG. 11(*a*), which uses a single antenna port or two antenna ports, has been shifted from the PRS pattern of FIG. 9(*a*) in such a manner that RE for the PRS of the OFDM symbols 1 and 2 of the second slot has been frequency-shifted as much as 1 and RE for the OFDM symbols 4 and 5 of the second slot has been frequency-shifted as much as 2. Also, the PRS pattern of FIG. 11(*b*), which uses four antenna ports, has been shifted from the PRS pattern of FIG. 9(*b*) in such a manner that RE for the PRS of the OFDM symbol 2 of the second slot has been frequency-shifted as much as 1 and RE for the OFDM symbols 4 and 5 of the second slot has been frequency-shifted as much as 2.

Referring to FIG. 10, since the number of REs that may be used for the PRS within a pair of resource blocks is 16 according to the PRS pattern that uses a single antenna port or two antenna ports, at least one PRS may be mapped into each of the (12 number of) subcarriers. In case of the PRS pattern that uses four antenna ports, the PRS pattern for a single antenna port or two antenna ports is maintained as it is and the PRS of the OFDM symbol 1 of the second slot is punctured.

Referring to FIG. 11, in case of the extended CP, since the number of REs that may be used for the PRS within one resource block and one subframe is 12 according to the PRS pattern that uses a single antenna port or two antenna ports, one PRS may be mapped into one subcarrier, whereby excellent auto correlation characteristics may be obtained. In case of the PRS pattern that uses four antenna ports, the PRS pattern for a single antenna port or two antenna ports is maintained as it is and the PRS of the OFDM symbol 1 of the second slot is punctured.

In the meantime, according to the first embodiment, the subcarriers each into which two or more reference signals are mapped are arranged at constant intervals based on the frequency domain. Referring to FIG. 10, in the PRS pattern that uses a single antenna port or two antenna ports, the number of REs into which the reference signal(s) is/are mapped in each of the subcarriers is [1, 1, 2, 1, 1, 2, 1, 1, 2, 1, 1, 2] along the frequency axis (vertical axis) downwardly. In other words, it is noted that the subcarriers each into which two reference signals are mapped occur uniformly at the interval of 3. If the reference signals mapped into the subcarriers are arranged regularly or at constant intervals, a side peak may be reduced in view of auto correlation characteristics. In this case, since the maximum peak may definitely be identified from the side peak, exactness of the estimated time may be increased.

Figure 12:
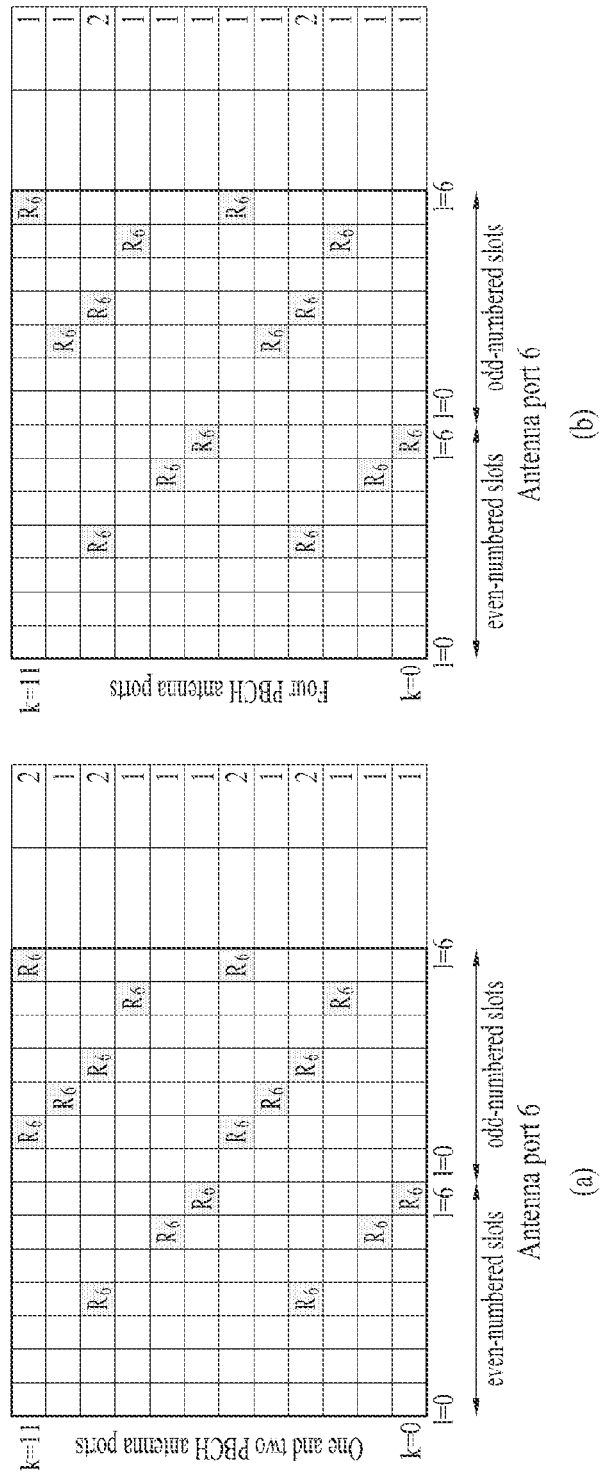
FIG. 12 is a diagram illustrating a pattern where a positioning reference signal according to the second embodiment of the present invention is arranged on a resource block.

FIG. 12 is a diagram illustrating a pattern where a positioning reference signal according to the second embodiment of the present invention is arranged on a resource block. FIG. 12(*a*) illustrates a PRS pattern, which uses a single antenna port or two antenna ports, in case of a normal CP, and FIG. 12(*b*) illustrates a PRS pattern, which uses four antenna ports, in case of a normal CP. In the PRS pattern of FIG. 12, it is noted that at least one reference signal may be mapped into every subcarrier in view of the frequency domain.

Referring to FIG. 12(*a*), it is assumed that the leftmost of the horizontal axis based on one slot is OFDM symbol 0 and the lowest of the vertical axis based on one slot is subcarrier 0. In this case, the PRS may be transmitted through RE of OFDM symbol 3 and subcarrier 3 of the first slot, RE of OFDM symbol 3 and subcarrier 9 of the first slot, RE of OFDM symbol 5 and subcarrier 1 of the first slot, RE of OFDM symbol 5 and subcarrier 7 of the first slot, RE of OFDM symbol 6 and subcarrier 0 of the first slot, RE of OFDM symbol 6 and subcarrier 6 of the first slot, RE of OFDM symbol 1 and subcarrier 5 of the second slot, RE of OFDM symbol 1 and subcarrier 11 of the second slot, RE of OFDM symbol 2 and subcarrier 4 of the second slot, RE of OFDM symbol 2 and subcarrier 10 of the second slot, RE of OFDM symbol 3 and subcarrier 3 of the second slot, RE of OFDM symbol 3 and subcarrier 9 of the second slot, RE of OFDM symbol 5 and subcarrier 2 of the second slot, RE of OFDM symbol 5 and subcarrier 8 of the second slot, RE of OFDM symbol 6 and subcarrier 5 of the second slot, and RE of OFDM symbol 6 and subcarrier 11 of the second slot.

Also, referring to FIG. 12(*b*), it is assumed that the leftmost of the horizontal axis based on one slot is OFDM symbol 0 and the lowest of the vertical axis based on one slot is subcarrier 0. In this case, the PRS may be transmitted through RE of OFDM symbol 3 and subcarrier 3 of the first slot, RE of OFDM symbol 3 and subcarrier 9 of the first slot, RE of OFDM symbol 5 and subcarrier 1 of the first slot, RE of OFDM symbol 5 and subcarrier 7 of the first slot, RE of OFDM symbol 6 and subcarrier 0 of the first slot, RE of OFDM symbol 6 and subcarrier 6 of the first slot, RE of OFDM symbol 2 and subcarrier 4 of the second slot, RE of OFDM symbol 2 and subcarrier 10 of the second slot, RE of OFDM symbol 3 and subcarrier 3 of the second slot, RE of OFDM symbol 3 and subcarrier 9 of the second slot, RE of OFDM symbol 5 and subcarrier 2 of the second slot, RE of OFDM symbol 5 and subcarrier 8 of the second slot, RE of OFDM symbol 6 and subcarrier 5 of the second slot, RE of OFDM symbol 6 and subcarrier 11 of the second slot.

The PRS pattern for a single antenna port or two antenna ports may partially be punctured to generate the PRS pattern for four antenna ports. At this time, the OFDM symbol corresponding to at least one PRS within the subcarriers into which a plurality of PRSs are mapped is selected as the punctured OFDM symbol, whereby the subcarrier into which the PRS is not mapped may not exist. For example, referring to FIG. 12, supposing that the lowest subcarrier based on the frequency axis (vertical axis) is subcarrier 0, the subcarriers into which a plurality of PRSs are mapped in FIG. 12(a) correspond to 3, 5, 9 and 11. Since two PRSs are mapped into the corresponding subcarriers, even though one PRS is punctured, there is no change in the auto correlation characteristics. Accordingly, the OFDM symbol that includes the subcarriers may be selected and punctured. Supposing that the leftmost of the slot based on the horizontal axis is OFDM symbol 0, one of the OFDM symbol 4 of the first slot and the OFDM symbols 1, 3 and 6 of the second slot may be selected and punctured. In the example of FIG. 12(a), the OFDM symbol 1 of the second slot is punctured.

In the meantime, according to the second embodiment, the subcarriers each into which two or more reference signals are mapped are arranged at irregular intervals on the basis of the frequency domain. Referring to FIG. 12, it is noted that the number of REs into which the reference signals are mapped in each subcarrier may be [2, 1, 2, 1, 1, 1, 2, 1, 2, 1, 1, 1] and [1, 1, 2, 1, 1, 1, 1, 2, 1, 1, 1] on the basis of the frequency axis (vertical axis) downwardly, whereby the intervals of the subcarriers are varied to 2, 4 and 3. Such irregular intervals of the subcarriers serve to increase the number of side peaks while reduces the output value of the generated side peak in view of the auto correlation characteristics.

The PRS pattern may be defined using the aforementioned Equation 4 and the following Equation 7.

$$k = 6(m + N_{RB}^{DL} - N_{RB}^{PRS}) + (6 - l + v_{shift}) \bmod 6 \quad \text{[Equation 7]}$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ PBCH antenna ports}) \\ 2, 3, 5, 6 & \text{if } n_s \bmod 2 = 1 \text{ and} \\ & (4 \text{ PBCH antenna ports}) \end{cases}$$

$$\Delta = \begin{cases} 1 & \text{if } n_s \bmod 2 = 1 \text{ and } l = 5 \\ 5 & \text{if } n_s \bmod 2 = 1 \text{ and } l = 6 \\ 0 & \text{otherwise} \end{cases}$$

$$m = 0, 1, \ldots, 2 \cdot N_{RB}^{PRS} - 1$$

$$m' = m + N_{RB}^{max,DL} - N_{RB}^{PRS}$$

FIG. 13 to FIG. 22 are graphs illustrating the results of performance comparison for positioning reference signal patterns. In more detail, FIG. 13 to FIG. 22 illustrate the comparison results of auto correlation measured values for the PRS pattern.

Figure 13:
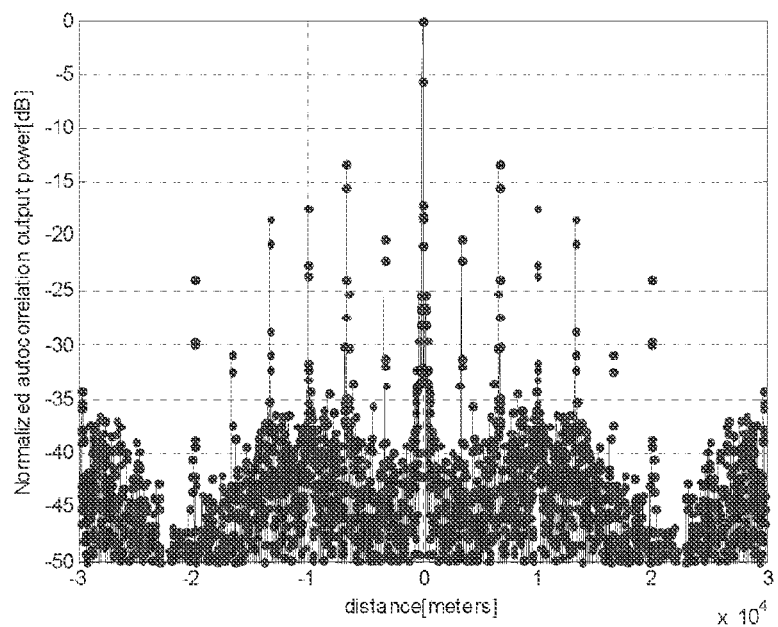
FIG. 13 to FIG. 15 are graphs illustrating auto correlation measured values for PRS pattern, which uses a single antenna port or two antenna ports, in a normal CP according to the related art, the first embodiment, and the second embodiment.
Figure 14:
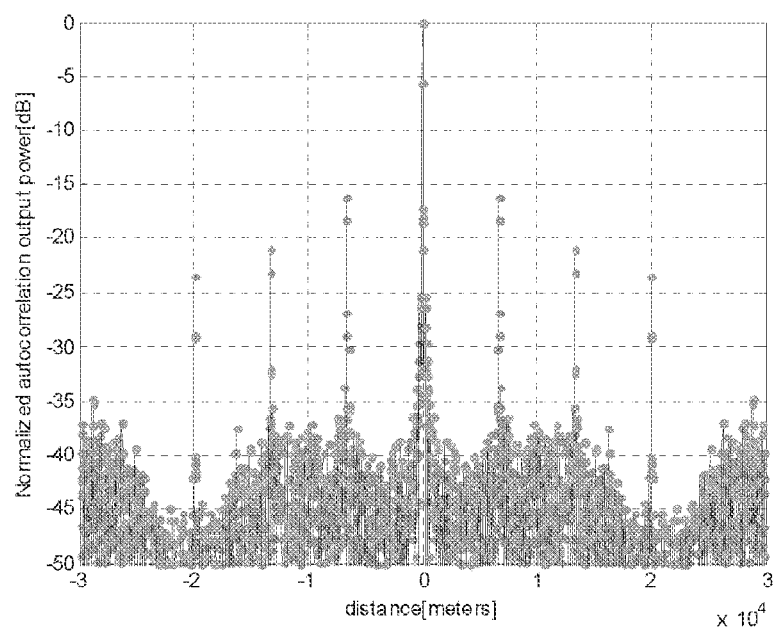
Figure 15:
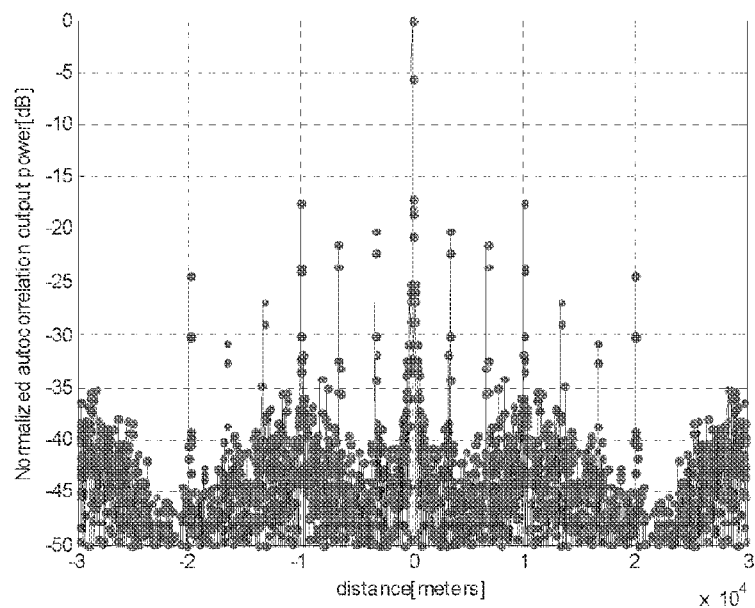

FIG. 13 to FIG. 15 are graphs illustrating auto correlation measured values for PRS pattern, which uses a single antenna port or two antenna ports, in a normal CP according to the related art, the first embodiment, and the second embodiment. In other words, FIG. 13 to FIG. 15 illustrate auto correlation measured values at a frequency band of 10 MHz (=50 RBs). Hereinafter, for convenience of the description, auto correlation measured values for the PRS pattern, which uses a single antenna port or two antenna ports, in a normal CP according to the related art will be referred to the first comparison example.

Referring to FIG. 13 to FIG. 15, in the first embodiment and the second embodiment, it is noted that a difference between an auto correlation output value of a second peak and an auto correlation output value of a maximum peak is lower than −15 dB. Also, as compared with the first comparison example, it is noted that the difference between the auto correlation output value of the second peak and the auto correlation output value of the maximum peak in the first embodiment and the second embodiment is greater than the second comparison example. If the difference between the auto correlation output value of the second peak and the auto correlation output value of the maximum peak becomes great, since the timing of the maximum peak may be calculated exactly, exactness of the estimated time may be increased as described above. In the meantime, according to the second embodiment, it is noted that the number of side peaks is smaller than that in the first embodiment. This is because that the PRSs mapped into the subcarriers are arranged regularly or at constant intervals. If the number of side peaks is small, exactness of the estimated time is increased as described above.

Figure 16:
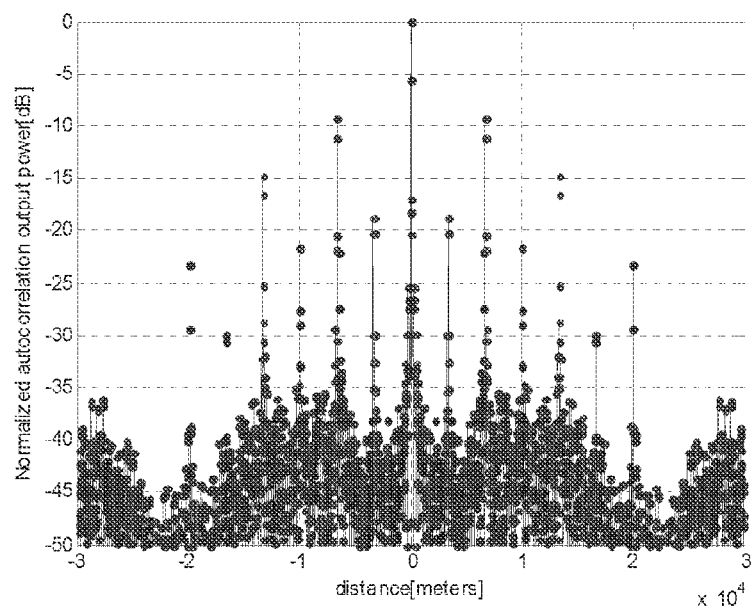
FIG. 16 to FIG. 18 are graphs illustrating auto correlation measured values for CRS pattern, which uses four antenna ports, in a normal CP according to the related art, the first embodiment, and the second embodiment.
Figure 17:
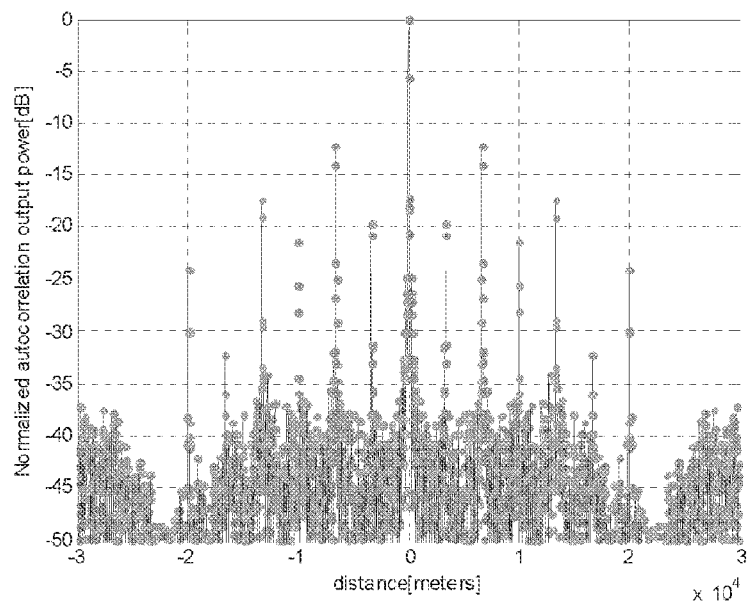
Figure 18:
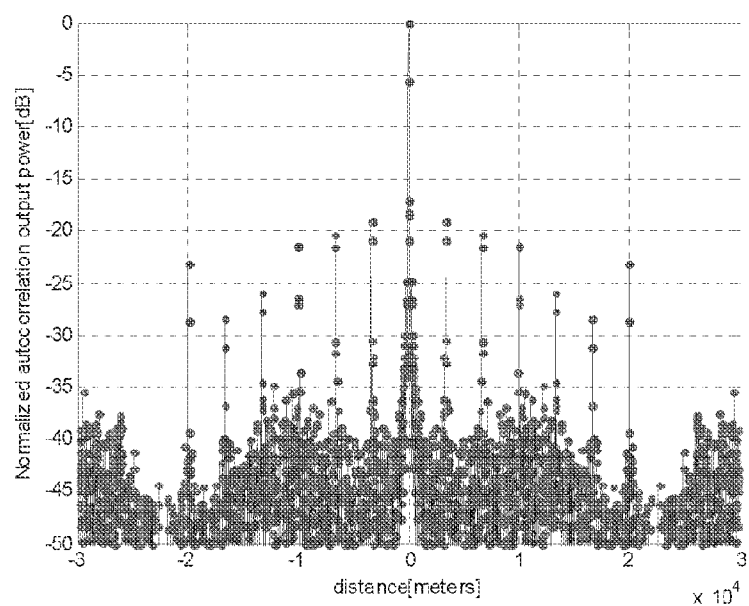

FIG. 16 to FIG. 18 are graphs illustrating auto correlation measured values for PRS pattern, which uses four antenna ports, in a normal CP according to the related art, the first embodiment, and the second embodiment. In other words, FIG. 16 to FIG. 18 illustrate auto correlation measured values at a frequency band of 10 MHz (=50 RBs). Hereinafter, for convenience of the description, auto correlation measured values for the PRS pattern, which uses four antenna ports, in a normal CP according to the related art will be referred to the second comparison example.

Referring to FIG. 16 to FIG. 18, in the first embodiment and the second embodiment, it is noted that a difference between an auto correlation output value of a second peak and an auto correlation output value of a maximum peak is lower than −13 dB. Also, as compared with the second comparison example, it is noted that the difference between the auto correlation output value of the second peak and the auto correlation output value of the maximum peak in the first embodiment and the second embodiment is greater than the second comparison example.

Figure 19:
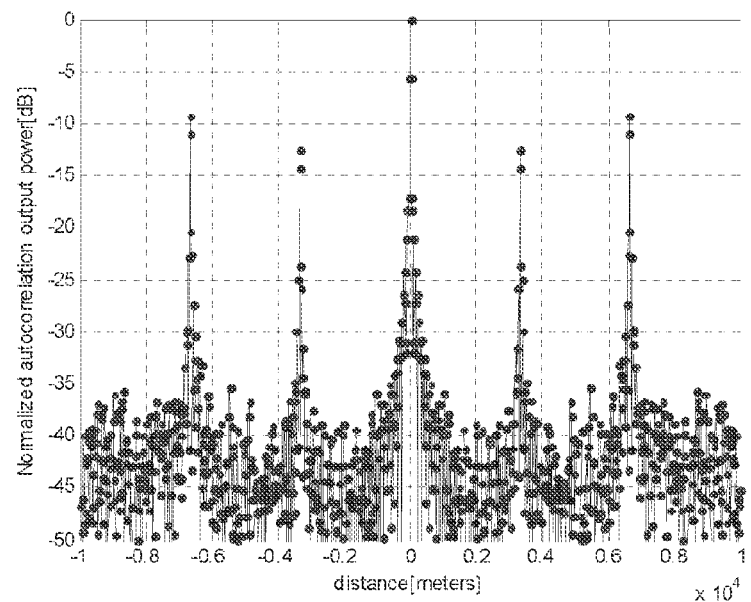
FIG. 19 and FIG. 20 are graphs illustrating auto correlation measured values for PRS pattern, which uses a single antenna port or two antenna ports, in an extended CP according to the related art and the first embodiment.
Figure 20:
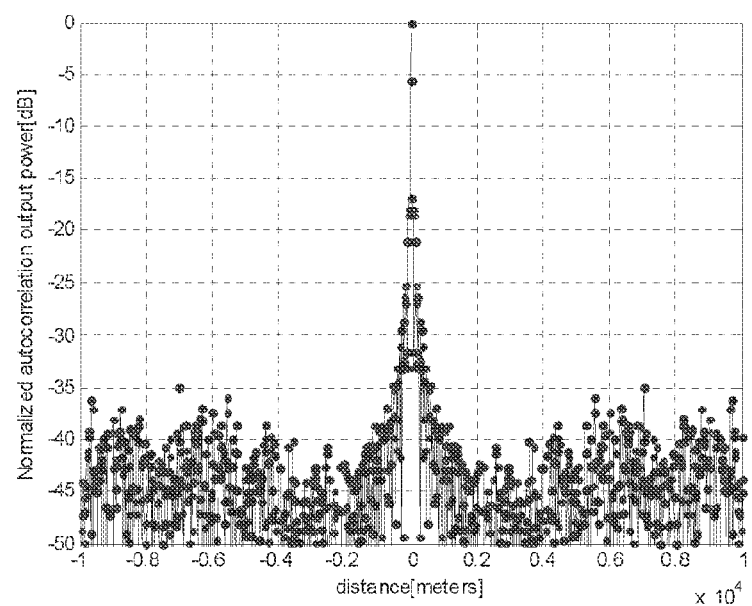

FIG. 19 and FIG. 20 are graphs illustrating auto correlation measured values for PRS pattern, which uses a single antenna port or two antenna ports, in an extended CP according to the related art, the first embodiment, and the second embodiment. In other words, FIG. 19 and FIG. 20 illustrate auto correlation measured values at a frequency band of 10 MHz (=50 RBs). Hereinafter, for convenience of the description, auto correlation measured values for the PRS pattern, which uses a single antenna port or two antenna ports, in an extended CP according to the related art will be referred to the third comparison example.

Referring to FIG. 19 and FIG. 20, it is noted that a difference between an auto correlation output value of a second peak and an auto correlation output value of a maximum peak of the first embodiment is lower than −13 dB. As compared with the third comparison example, it is noted that the difference between the auto correlation output value of the second peak and the auto correlation output value of the maximum peak in the first embodiment is definitely identified from the third comparison example. Also, it is noted that the number of side peaks is definitely identified from that of the third comparison example. In other words, as compared with the third comparison example, it is noted that exactness of the estimated time is greatly increased in the first embodiment.

Figure 21:
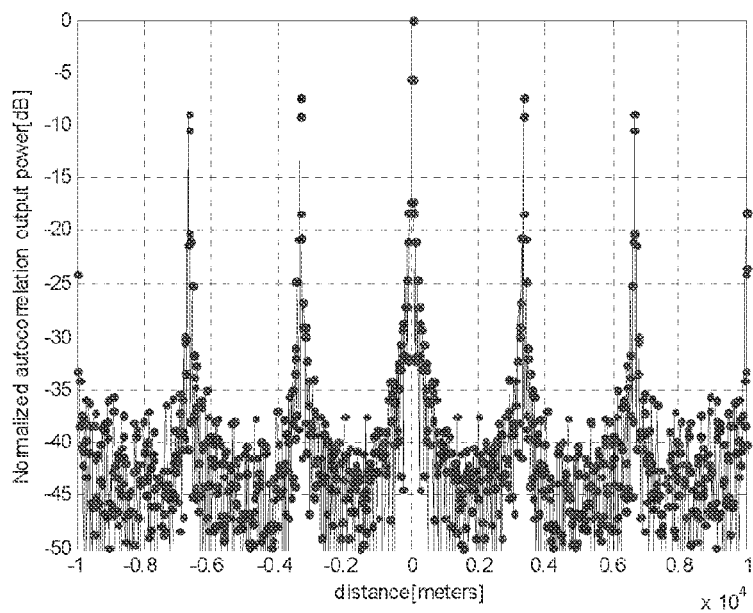
FIG. 21 and FIG. 22 are graphs illustrating auto correlation measured values for PRS pattern, which uses four antenna ports, in an extended CP according to the related art and the first embodiment.
Figure 22:
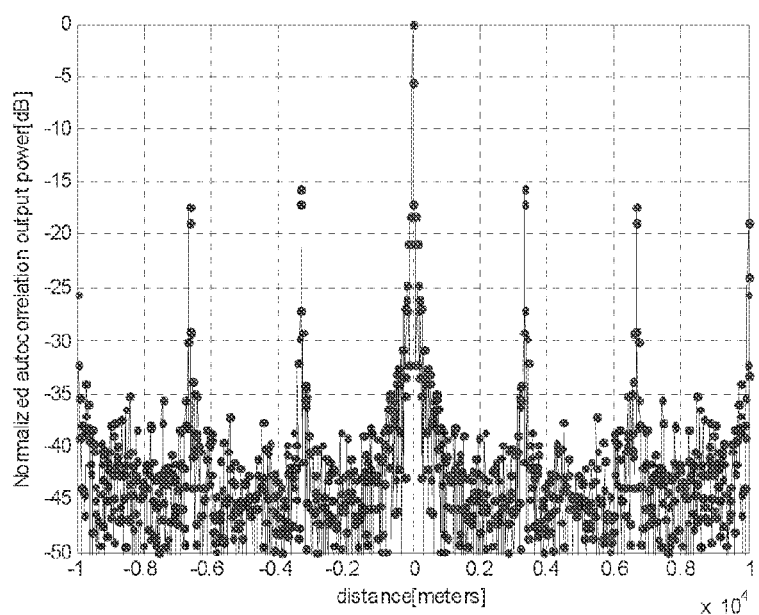

FIG. 21 and FIG. 22 are graphs illustrating auto correlation measured values for PRS pattern, which uses four antenna ports, in an extended CP according to the related art, the first embodiment, and the second embodiment. In other words, FIG. 21 and FIG. 22 illustrate auto correlation measured values at a frequency band of 10 MHz (=50 RBs). Hereinafter, for convenience of the description, auto correlation measured values for the PRS pattern, which uses four antenna ports, in an extended CP according to the related art will be referred to the fourth comparison example.

Referring to FIG. 21 and FIG. 22, it is noted that a difference between an auto correlation output value of a second peak and an auto correlation output value of a maximum peak of the first embodiment is lower than −13 dB. As compared with the fourth comparison example, it is noted that the difference between the auto correlation output value of the second peak and the auto correlation output value of the maximum peak in the first embodiment is greatly improved.

Table 1 illustrates the difference between the maximum peak and the second side peak in auto correlation measured values based on the PRS pattern that uses a single antenna port or two antenna ports.

TABLE 1

|  | Normal cyclic prefix | | | Extended cyclic prefix | |
| --- | --- | --- | --- | --- | --- |
|  | First comparison example | First embodiment | Second embodiment | Third comparison example | First embodiment |
| Output difference [dB] between maximum peak and second side peak | −13.04 | −15.92 | −17.09 | −9.28 | −35 |

In more detail, Table 1 represents difference values between the maximum side peak value and the maximum peak value of auto correlation output by using the measured values of FIG. 13 to FIG. 15 and FIG. 19 to FIG. 20. If the difference between the output of the maximum peak and the output of next peak becomes great, positioning performance is improved. In case of the normal CP, it is noted that positioning performance of the PRS pattern according to the first and second embodiments is more improved than that of the first comparison example. In case of the extended CP, it is noted that positioning performance of the PRS pattern according to the first embodiment is more improved than that of the third comparison example.

Table 2 illustrates the difference between the maximum peak and the second side peak in auto correlation measured values based on the PRS pattern that uses four antenna ports.

TABLE 2

|  | Normal cyclic prefix | | | Extended cyclic prefix | |
| --- | --- | --- | --- | --- | --- |
|  | Second comparison example | First embodiment | Second embodiment | Fourth comparison example | First embodiment |
| Output difference [dB] between maximum peak and second side peak | −9.66 | −12.19 | −17.02 | −7.36 | −16 |

Table 2 represents difference values between the maximum side peak value and the maximum peak value of auto correlation output by using the measured values of FIG. 16 to FIG. 18 and FIG. 21 and FIG. 22. As a result of simulation for the PRS pattern that uses four antenna ports, it is noted that positioning performance is more improved than that of the comparison example of the related art.

In the meantime, it will be apparent that various PRS patterns according to the first and second embodiments may be applied in accordance with positioning performance.

Figure 23:
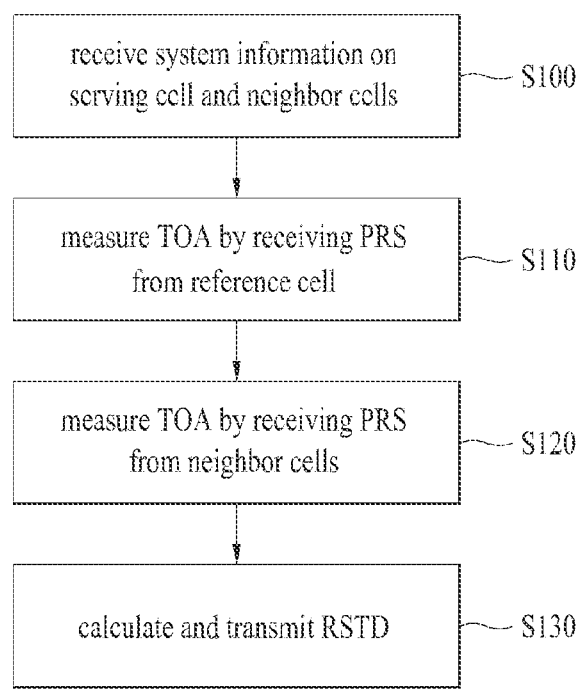
FIG. 23 is a diagram illustrating a method for determining a location of a user equipment according to one embodiment of the present invention.

FIG. 23 is a diagram illustrating a method for determining a location of a user equipment according to one embodiment of the present invention. Referring to FIG. 23, the user equipment receives system information on a serving cell and a plurality of neighbor cells, which are required to calculate reference signal time difference (RSTD), from a location server (S100). The serving cell may correspond to a reference cell for RSTD calculation. The RSTD means a relative timing difference between the reference cell and a neighbor cell. Afterwards, the user equipment measures time of arrival (TOA) of PRS of the reference cell by receiving the PRS from the base station of the reference cell (S110). Also, the user equipment measures TOA of each PRS of the neighbor cells by receiving PRSs from the base stations of the neighbor cells (S120). TOA means the time when the PRS is received from a base station of a specific cell. The user equipment calculates RSTD of the reference cell of each of the plurality of neighbor cells by using TOA of the PRS of the reference cell and TOA of each PRS of the plurality of neighbor cells and transmits the calculated RSTD to the location server through a serving base station (S130). The location server estimates the location of the user equipment by using the received RSTD.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station.

The base station may be replaced with terms such as a fixed station, Node B, eNode B (eNB), and access point. Also, the user equipment may be replaced with terms such as mobile station (MS) and mobile subscriber station (MSS). Also, the relay may be replaced with terms such as a relay node (RN) and a relay station (RS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention may be applied to a user equipment, a base station or other device of a wireless communication system. In more detail, the present invention may be applied to a method for determining a location of a user equipment and a device for the same.

The invention claimed is:

1. A method for determining a location of a user equipment in a wireless communication system, the method comprising:
    receiving reference signals from a plurality of base stations; and
    transmitting a reference signal time difference (RSTD) between the received reference signals received from the plurality of base stations,
    wherein the reference signals are mapped within a subframe according to a predetermined pattern,
    wherein the subframe includes at least one basic unit of which size corresponds to 12 subcarriers×14 OFDM symbols,
    wherein the reference signals are mapped into at least one resource element within the basic unit where an resource element is a time-frequency resource defined by one subcarrier and one OFDM symbol, and
    wherein the predetermined pattern is configured as illustrated in the following Pattern Table 1, where "P" represents a resource element into which the reference signals are mapped, "SC" is a subcarrier index, and "S" is an OFDM symbol index:

Pattern Table 1

| | S=0 | S=1 | S=2 | S=3 | S=4 | S=5 | S=6 | S=7 | S=8 | S=9 | S=10 | S=11 | S=12 | S=13 |
|---|---|---|---|---|---|---|---|---|---|---|---|---|---|---|
| SC=11 | | | | | | | | | P | | | | | |
| SC=10 | | | | | | | | | | P | | | | |
| SC=9 | | | | P | | | | | | | P | | | |
| SC=8 | | | | | | | | | | | | | P | |
| SC=7 | | | | | | P | | | | | | | | |
| SC=6 | | | | | | | P | | | | | | | P |
| SC=5 | | | | | | | | P | | | | | | |
| SC=4 | | | | | | | | | | P | | | | |
| SC=3 | | | | P | | | | | | | P | | | |
| SC=2 | | | | | | | | | | | | | P | |
| SC=1 | | | | | | P | | | | | | | | |
| SC=0 | | | | | | | P | | | | | | | P. |

2. The method according to claim 1, wherein the reference signals comprise positioning reference signals (PRSs).

3. The method according to claim 1, wherein the predetermined pattern is cyclic-shifted per cell.

4. The method according to claim 1, wherein:
    a first N number of OFDM symbols within the subframe are used for a control channel; and
    more than (N+1) OFDM symbols are used to determine a location of the user equipment.

5. A user equipment in a wireless communication system, the user equipment comprising:
    a receiver configured to receive reference signals from a plurality of base stations; and
    a controller configured to calculate a reference signal time difference (RSTD) between the received reference signals received from the plurality of base stations,
    wherein the reference signals are mapped within a subframe according to a predetermined pattern,
    wherein the subframe includes at least one basic unit of which size corresponds to 12 subcarriers×14 OFDM symbols, wherein the reference signals are mapped into at least one resource element within the basic unit where an resource element is a time-frequency resource defined by one subcarrier and one OFDM symbol, and wherein the predetermined pattern is configured as illustrated in the following Pattern Table 1, where "P" represents a resource element into which the reference signals are mapped, "SC" is a subcarrier index, and "S" is an OFDM symbol index:

| Pattern Table 1 | | | | | | | | | | | | | | |
|---|---|---|---|---|---|---|---|---|---|---|---|---|---|---|
| | S=0 | S=1 | S=2 | S=3 | S=4 | S=5 | S=6 | S=7 | S=8 | S=9 | S=10 | S=11 | S=12 | S=13 |
| SC = 11 | | | | | | | | P | | | | | | |
| SC = 10 | | | | | | | | | | P | | | | |
| SC = 9 | | | P | | | | | | | | P | | | |
| SC = 8 | | | | | | | | | | | | | P | |
| SC = 7 | | | | P | | | | | | | | | | |
| SC = 6 | | | | | | P | | | | | | | | P |
| SC = 5 | | | | | | | | | P | | | | | |
| SC = 4 | | | | | | | | | | P | | | | |
| SC = 3 | | P | | | | | | | | | P | | | |
| SC = 2 | | | | | | | | | | | | P | | |
| SC = 1 | | | | | P | | | | | | | | | |
| SC = 0 | | | | | | | P | | | | | | | P. |

6. The user equipment according to claim 5, wherein the reference signals comprise positioning reference signals (PRSs).

7. The user equipment according to claim 5, wherein the predetermined pattern is cyclic-shifted per cell.

\* \* \* \* \*